United States Patent [19]
Kumagai et al.

[11] Patent Number: 5,893,215
[45] Date of Patent: Apr. 13, 1999

[54] INCLINATION SENSOR AND SURVEYING INSTRUMENT USING THE SAME

[75] Inventors: Kaoru Kumagai; Fumio Ohtomo, both of Tokyo, Japan

[73] Assignee: Kabushiki Kaisha Topcon, Tokyo, Japan

[21] Appl. No.: 08/843,586

[22] Filed: Apr. 16, 1997

[30] Foreign Application Priority Data

Apr. 17, 1996 [JP] Japan .................... 8-119759

[51] Int. Cl.⁶ .................................................. G01C 9/06
[52] U.S. Cl. .................... 33/366; 33/390; 356/249
[58] Field of Search .................... 33/366, 365, 377, 33/390; 356/138, 139.1, 148, 152.1, 249

[56] References Cited

U.S. PATENT DOCUMENTS

| | | | |
|---|---|---|---|
| 3,009,255 | 11/1961 | Robillard | 33/390 |
| 4,993,162 | 2/1991 | Scholian | 33/366 |
| 5,392,112 | 2/1995 | Nakamura | 33/366 |
| 5,513,001 | 4/1996 | Ohtomo et al. | 33/366 |
| 5,625,955 | 5/1997 | Han | 33/390 |

FOREIGN PATENT DOCUMENTS 2564580  11/1985  France .................... 33/390

*Primary Examiner*—G. Bradley Bennett
*Attorney, Agent, or Firm*—Baker & Botts, L.L.P.

[57] ABSTRACT

The present invention relates to an inclination sensor capable of detecting inclinations in two X- and Y- axis directions with use of only a single linear sensor. In this inclination sensor, a first optical system collimates the light emitted from a light source, a dark field pattern allows the light from the first optical system to pass therethrough, a half mirror changes the direction of the light which has passed through the dark field pattern, a first liquid member reflects the light which has been changed its direction by the half mirror, a second optical system focuses the light reflected by the first liquid member, the light receiving means receives a light image formed by the second optical system, and the processing means calculates an inclination on the basis of a reception signal provided from the light receiving means. The dark field pattern is constituted by a plurality of slits in such a manner that central lines of the pattern are arranged at equal pitches in one direction and that the pattern width varies in a direction orthogonal to the one direction.

11 Claims, 6 Drawing Sheets

$$dy_{AVE} = (dy_1 + dy_2 + \cdots + dy_m)/m$$

20000

INCLINATION SENSOR AND SURVEYING INSTRUMENT USING THE SAME

BACKGROUND OF THE INVENTION

The present invention relates to an inclination sensor which utilizes a liquid member having a free surface. In particular, the invention is concerned with an inclination sensor best suited for a surveying instrument and capable of detecting inclinations in two X- and Y-axis directions, using only a single linear sensor, as well as a surveying instrument using the inclination sensor.

Heretofore, as a device for detecting inclinations of a surveying instrument there has been used such a bubble tube 10000 as shown in FIG. 9. In the interior of the bubble tube 10000, bubbles 5000 are sealed and electrodes 6000 and 7000 are formed, to measure a capacitance electrically and thereby determine an inclination.

However, since the outer peripheral portion of the bubble tube 10000 is formed of glass, it is weak against impact and a high mechanical accuracy is required, thus giving rise to the problem that the cost is high.

Further, for measuring inclinations in both X- and Y-axis directions, it is necessary to use two bubble tubes 10000 in two-axis directions, thus causing an increase of cost.

Additionally, the bubble tube 10000 is also influenced by changes in ambient temperature and hence it has so far been required to make correction of temperature changes.

SUMMARY OF THE INVENTION

According to the present invention, a first optical system collimates light emitted from a light source, a dark field pattern allows the light from the first optical system to pass therethrough, a half mirror changes the direction of the light which has passed through the dark field pattern, a first liquid member reflects the light thus changed its direction by the half mirror, a second optical system focuses the light reflected by the first liquid member, a light receiving means receives the light image formed by the second optical system, and a processing means calculates an inclination on the basis of a reception signal provided from the light receiving means. The dark field pattern is formed by a plurality of slits in such a manner that central lines of the slits are arranged at equal pitches in one direction and that the pattern width varies in a direction orthogonal to the one direction.

BRIEF DESCRIPTION OF THE DRAWINGS

The accompanying drawings illustrate embodiments of the present invention, in which.

DETAILED DESCRIPTION OF THE PREFERRED EMBODIMENTS

Embodiments of the present invention will be described hereinunder with reference to the drawings.

[First Embodiment]

Figure 1:
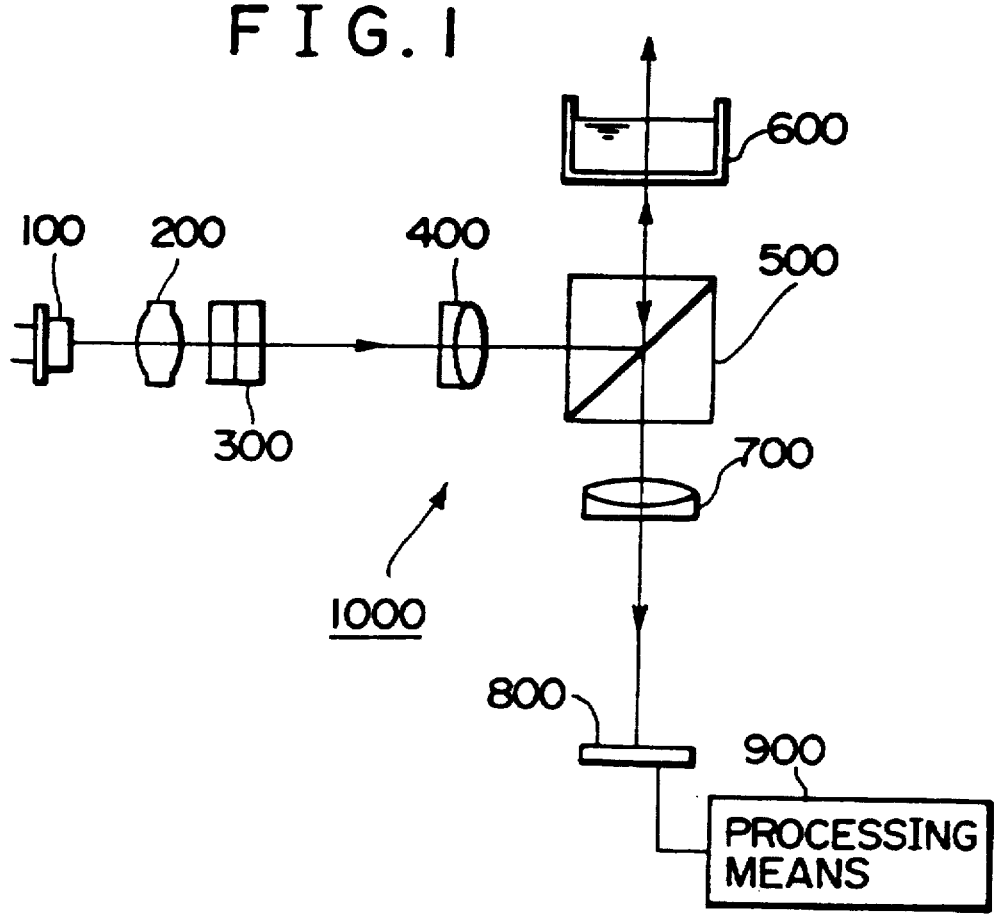
FIG. 1 is a diagram showing the construction of an inclination sensor according to a first embodiment of the invention.

FIG. 1 illustrates an optical construction of an inclination sensor 1000 according to a first embodiment of the invention. The inclination sensor 1000 comprises a light source 100, a condenser lens 200, a dark field pattern 300, a first pattern relay lens 400, a half mirror 500, a first liquid member 600 having a free surface, a second pattern relay lens 700, a light receiving means 800, and a processing means 900.

The light source 100 used in the first embodiment is a light emitting diode (LED), provided any other light source may be used.

The condenser lens 200, which is for collimating the light emitted from the light source 100, corresponds to a first optical system.

The dark field pattern 300 is for forming a pattern image in the light receiving means 800.

Figure 2:
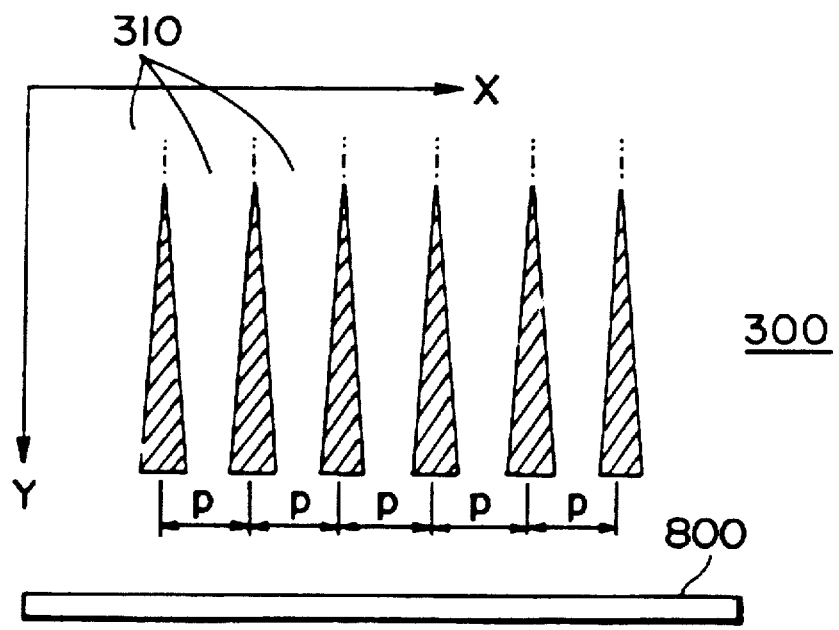
FIG. 2 is a diagram explaining a dark field pattern used in the first embodiment.

FIG. 2 illustrates a dark field pattern 300 used in the first embodiment, which pattern is composed of plural slits 310, 310, . . . It is here assumed that the direction orthogonal to the plural slits 310, 310, . . . is X direction and that the longitudinal direction of each slit 310 is Y direction.

The plural slits 310, 310, . . . are arranged in such a manner that their central points are spaced from one another at equal intervals P and that the slit width varies in a direction orthogonal to the arranged direction of the slits.

The first pattern relay lens 400 is for conducting the light which has passed through the dark field pattern 300 to the half mirror 500.

The light is changed its direction by the half mirror 500, then advances upward and enters the first liquid member 600 which has a free surface. The light after reflected by the first liquid member 600 passes through the half mirror 500 and travels toward the light receiving means 800 which is located at a lower position.

The first liquid member 600 having a free surface is filled with a liquid having a moderate viscosity, e.g. silicone oil. Since the first liquid member 600 has a free surface, the surface thereof is sure to be held level.

The second pattern relay lens 700 is for focusing the light which has been reflected by the first liquid member 600 having a free surface and which has passed through the half mirror 500, onto the light receiving means 800. That is, the second pattern relay lens 700 is for forming an image of the dark field pattern 300 onto the light receiving means 800.

The second pattern relay lens 700, which corresponds to a second optical system, is disposed at a position spaced a focal distance, f, of the lens 700 from the light receiving means 800.

The light receiving means 800 is for receiving a light image of the dark field pattern 300 and converting it into an electrical signal. A CCD (charge-coupled device) linear sensor is used as the light receiving means in this embodiment.

The processing means 900, including a CPU, is for making a total control and calculating a shift distance of slit image in the dark field pattern 300 to determine a corresponding inclination angle.

In this first embodiment constructed as above, when the inclination sensor 1000 inclines, the free surface of the first liquid member 600 is kept level, so that the image of the dark field pattern 300 on the light receiving means 800 shifts in proportion to the angle of inclination.

In the case where the inclination sensor 1000 inclines at an angle of θ, then if the refractive index of the first liquid member 600 is n, it follows that the light reflected from the free surface inclines 2nθ. Given that the corresponding distance on the linear sensor as the light receiving means 800 is L:

$$L = f \times \tan(2n\theta) \qquad \text{Formula 1}$$

Therefore, if the amount of shift of the slits 310 in the dark field pattern 300 is detected by the light receiving means 800 and is converted to an inclination angle by the processing means 900, it is possible to determine the inclination θ of the inclination sensor 1000.

[Second Embodiment]

Figure 3:
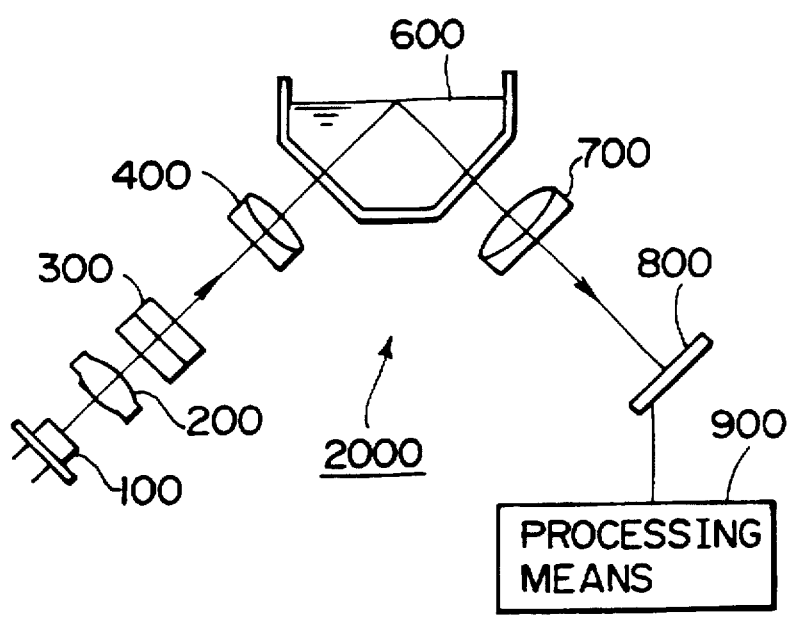
FIG. 3 is a diagram showing the construction of an inclination sensor according to a second embodiment of the invention.

FIG. 3 illustrates an optical construction of an inclination sensor 2000 according to a second embodiment of the invention. The inclination sensor 2000 comprises a light source 100, a condenser lens 200, a dark field pattern 300, a first pattern relay lens 400, a first liquid member 600 having a free surface, a second pattern relay lens 700, a light receiving means 800, and a processing means 900.

According to the construction of the inclination sensor 2000 of this second embodiment, the half mirror 500 used in the inclination sensor 1000 of the first embodiment is omitted, and light is directed obliquely through the first pattern relay lens 400 to the first liquid member 600 having a free surface. The light thus incident on the first liquid member 600 is reflected also obliquely and is focused on the light receiving means 800 through the second pattern relay lens 700. Thus, the light receiving means 800 is disposed inclinedly.

Other constructional points are the same as in the first embodiment, so explanations thereof are here omitted.

[Third Embodiment]

Figure 4:
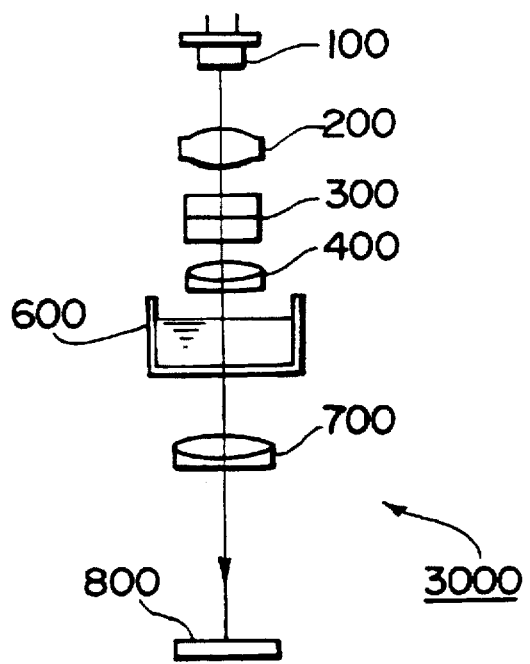
FIG. 4 is a diagram showing the construction of an inclination sensor according to a third embodiment of the invention.

FIG. 4 illustrates an optical construction of an inclination sensor 3000 according to a third embodiment of the present invention. The inclination sensor 3000 comprises a light source 100, a condenser lens 200, a dark field pattern 300, a first pattern relay lens 400, a first liquid member 600 having a free surface, a second pattern relay lens 700, a light receiving means 800, and a processing means 900.

In the inclination sensor 3000 of this third embodiment, the half mirror 500 and the first pattern relay lens 400 both used in the inclination sensor 1000 of the first embodiment are omitted, and light is directed vertically from above to the first liquid member 600 having a free surface. Light which has passed through the first liquid member 600 travels vertically downward and is focused on the light receiving means 800 by the second pattern relay lens 700.

Since other constructional points are the same as in the first and second embodiments, explanations thereof are here omitted.

A detailed description will be given below about an inclination angle calculating process performed by the processing means 900.

A linear sensor serving as the light receiving means 800 is disposed in a direction (X direction) orthogonal to the image of plural slits 310, 310, . . . .

Figure 7:
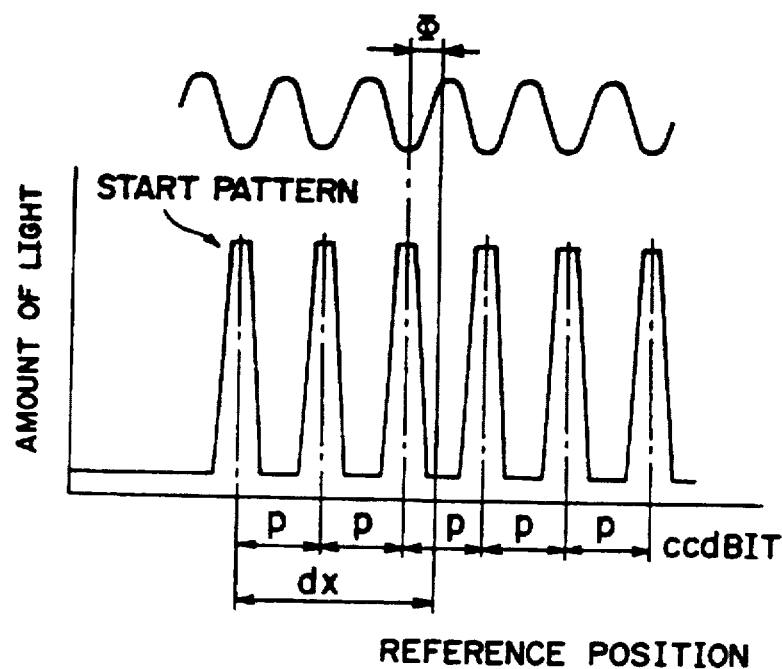
FIG. 7 is a diagram explaining an inclination angle calculating process performed by a processing means.
Figure 8:
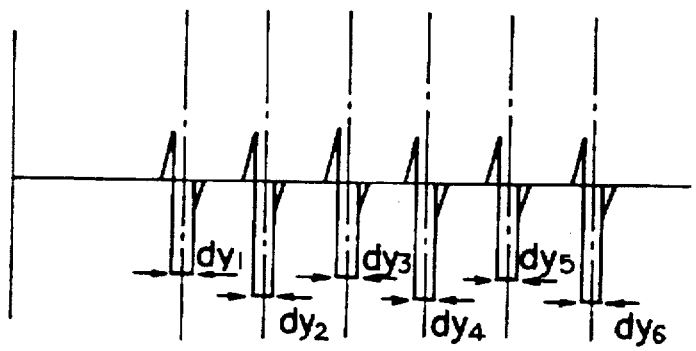
FIG. 8 is a diagram explaining an inclination angle calculating process performed by the processing means.
Figure 9:
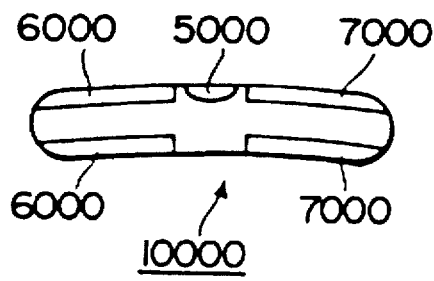
FIG. 9 is a diagram explaining the prior art.

As to the inclination angle, therefore, it can be determined by taking note of a specific pattern of slits 310, . . . as a start pattern and measuring a distance, dx, from a preset level position as a reference position, as shown in FIG. 7.

As to a distance shorter than the distance of each pitch, it can be determined with a high accuracy by performing Fourier transformation for the output of the linear sensor to calculate a phase difference φ between the pitch and the level position as the reference position and by solving the following formula:

$$\phi \times p / (2\pi) \qquad \text{Formula 2}$$

Then, by combining the distance thus determined with a distance longer than the pitch obtained from the foregoing distance of the start pattern, it is possible to determine the total distance.

On the basis of the total amount of shift the processing means 900 can calculate a corresponding inclination angle in the X direction.

As to the angle of inclination in the Y direction, it is calculated using a triangular slit 310b having a varying width.

More specifically, Since the linear sensor is disposed in the X direction, inclination thereof in the Y direction causes a change in the light receiving width of the triangular slit 310b. The processing means 900 can calculate the angle of inclination in the Y direction.

In measuring the width in the Y direction, as shown in FIG. 7, the distance between leading and trailing edges in the output of the linear sensor can be determined by differentiating the said output. Further, for the purpose of enhancing the measurement accuracy, the distance L on the linear sensor can be expressed as follows by performing calculation for all signals, determining an average width $dy_{ave}$, and using a pitch width, p, obtained by Fourier transform and also using a predetermined proportional relation, k:

$$L = k \times dy_{ave} / p \qquad \text{Formula 3}$$

Further, inclination in the Y direction can be calculated from Formula 1.

The width varying slit is not limited to a triangular shape. It may be of any other shape insofar as the width thereof varies and a correspondence to inclination can be set.

Thus, by merely using a single linear sensor, it is possible to detect inclinations in two-axis directions, i.e., X and Y directions.

The adoption of an area sensor, not a linear sensor, and the use of plural slits 310, 310, . . . formed at equal intervals, permit detection of inclinations in two X- and Y-axis directions.

Further, the first liquid member 600 having a free surface may be substituted by a swingable suspended member.

[Fourth Embodiment]

Figure 5:
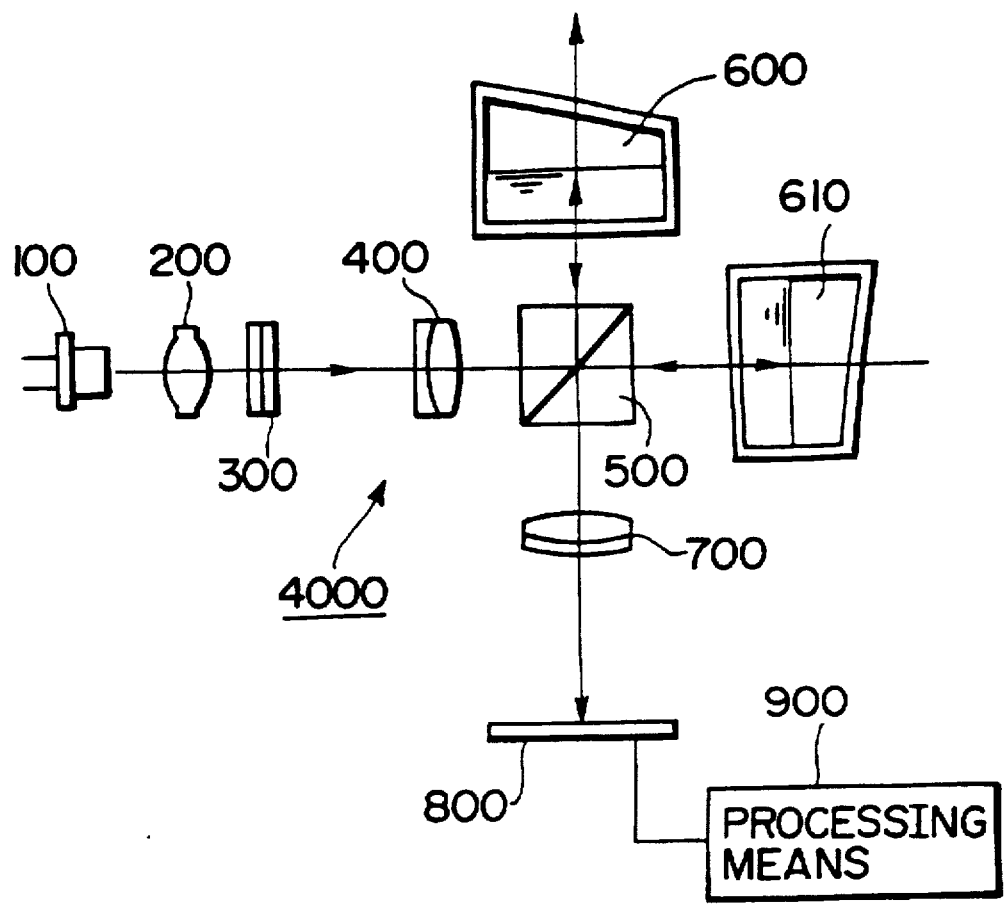
FIG. 5 is a diagram showing the construction of an inclination sensor according to a fourth embodiment of the invention.
Figure 6:
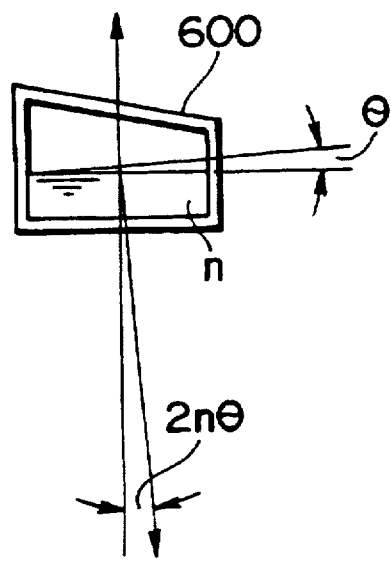
FIG. 6 is a diagram explaining a first liquid member.

FIG. 5 illustrates an optical construction of an inclination sensor 4000 according to a fourth embodiment of the present invention. The inclination sensor 4000 comprises a light source 100, a condenser lens 200, a dark field pattern 300, a first pattern relay lens 400, a half mirror 500, a first liquid member 600 having a free surface, a second liquid member 610 having a free surface, a second pattern relay lens 700, a light receiving means 800, and a processing means 900.

If this fourth embodiment is practiced in the same manner as in the first embodiment, the first liquid member 600 forms a free surface, while the second liquid member 610 is deviated from the optical path, and thus this construction is the same as that of the first embodiment.

In this fourth embodiment, as shown in FIG. 5, if the whole is turned 90 degrees leftwards, the second liquid member 610 forms a free surface, while the first liquid member 600 becomes deviated from the optical path. Thus, the second liquid member 610 is disposed so as to be employable even when the inclination sensor of the first embodiment is turned 90 degrees.

Therefore, when the inclination sensor 4000 inclines, the free surface of the second liquid member 610 is kept level, so that the image of the dark field pattern 300 on the light receiving means 800 shifts in proportion to the inclination angle.

The pattern image which has passed through the half mirror 500 is reflected by the second liquid member 610, then passes through the half mirror 500 and the second pattern relay lens 700, and is focused on the light receiving means 800. In this case, the light incident on the first liquid member 600 is not reflected because the liquid is deviated from the optical path.

Thus, by a mere addition of the second liquid member 610, it becomes possible for the inclination sensor 4000 shown in FIG. 5 to be used in two directions.

Figure 10:
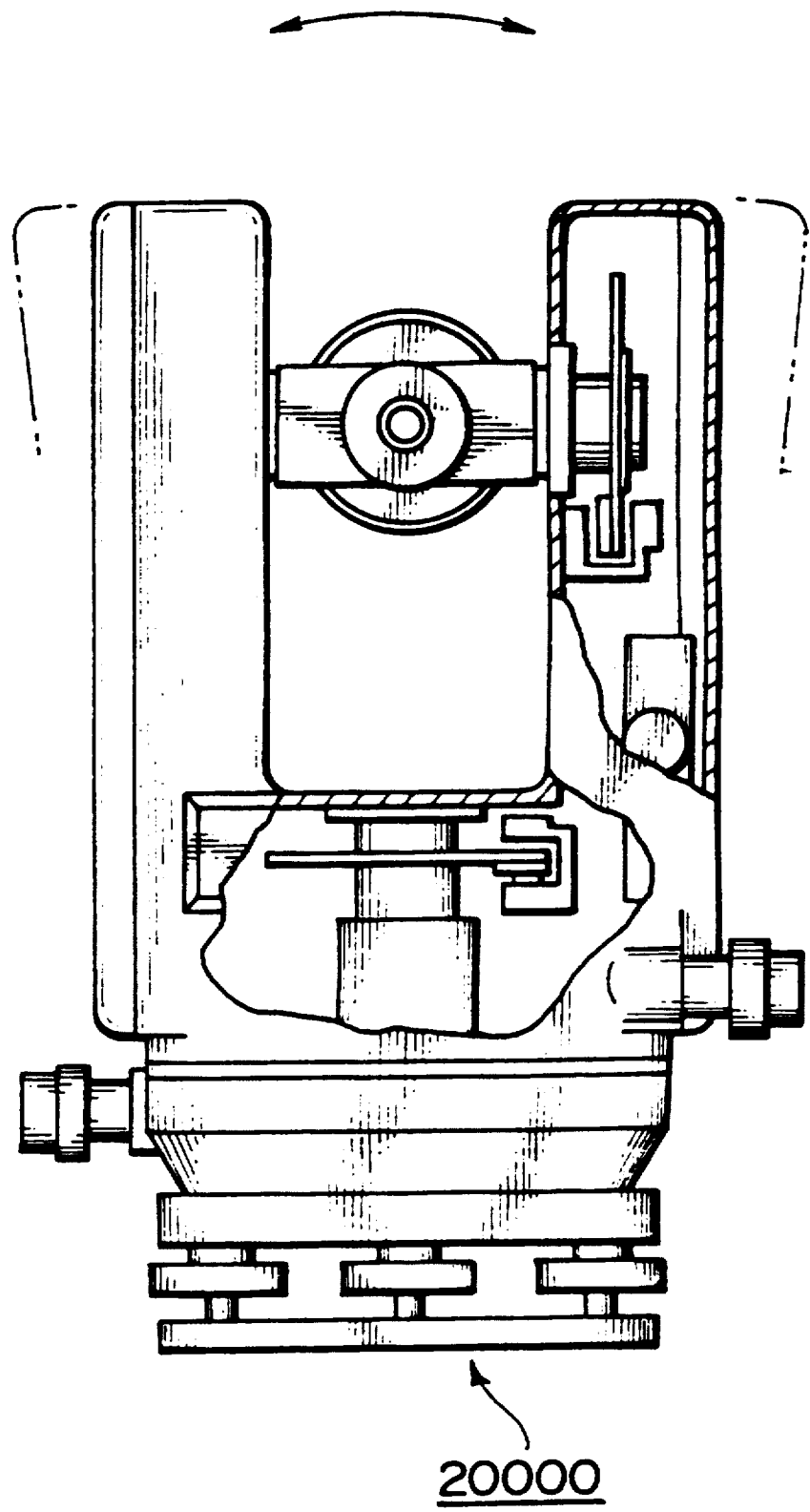
FIG. 10 is a diagram showing an example in which the invention is applied to an electronic theodolite.
Figure 11:
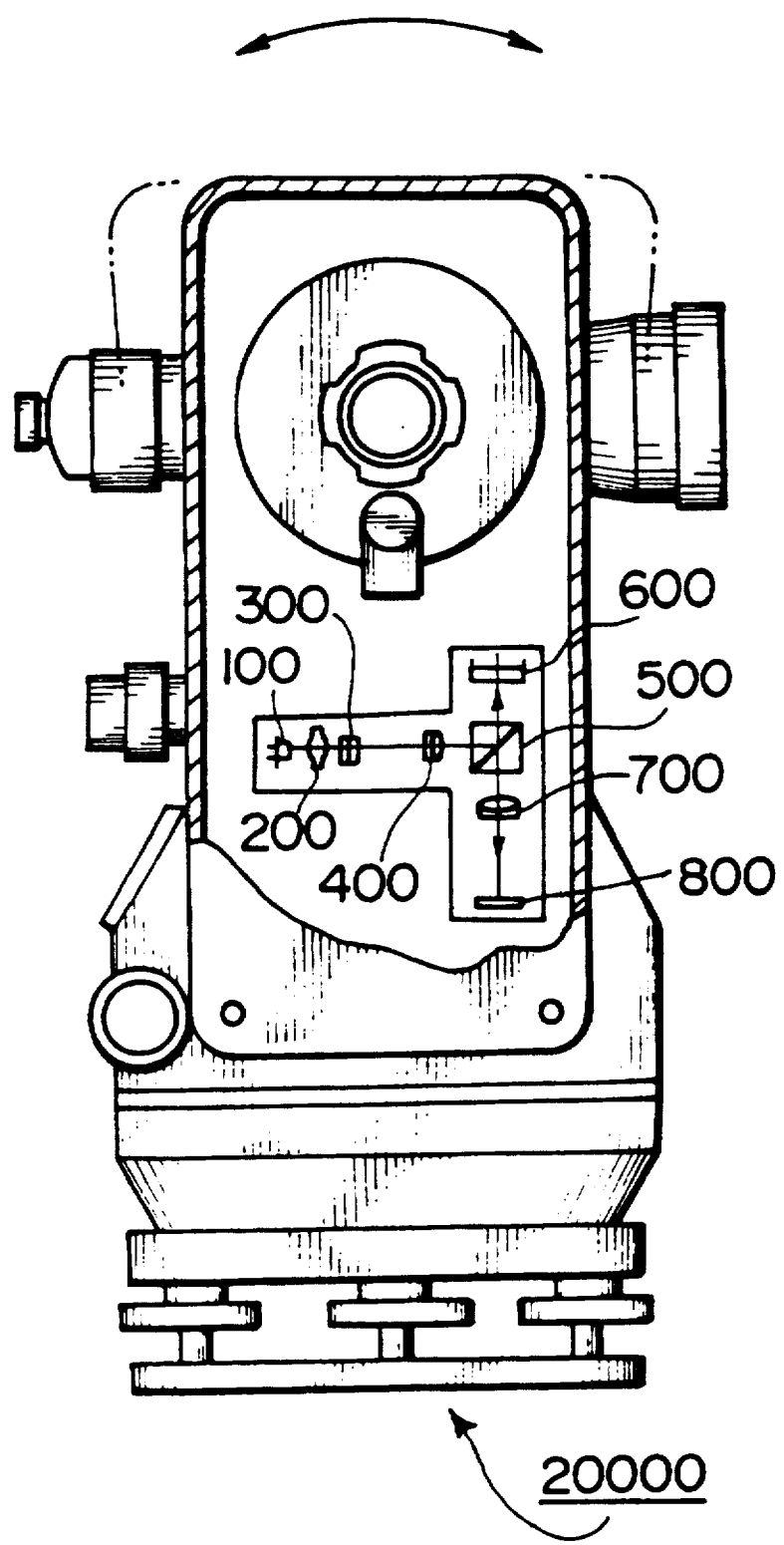
FIG. 11 is a diagram showing an example in which the invention is applied to the electronic theodolite.

Further, if the inclination sensor according to the present invention is attached to such an electronic theodolite 20000 as shown in FIGS. 10 and 11, it is possible to detect inclinations in both X and Y directions of the body of a surveying instrument.

In the present invention constructed as above, the first optical system collimates the light emitted from the light source, the dark field pattern allows the light from the first optical system to pass therethrough, the half mirror changes the direction of the light which has passed through the dark field pattern, the first liquid member having a free surface reflects the light which has been changed its direction by the half mirror, the second optical system focuses the light reflected by the first liquid member, the light receiving means receives the light image formed by the second optical system, and the processing means calculates an inclination on the basis of the reception signal provided from the light receiving means. The dark field pattern is constituted by a plurality of slits in such a manner that central lines of the slits are arranged at equal pitches in one direction, while the pattern width varies in a direction orthogonal to the one direction. Consequently, it is possible to provide an inclination sensor of a high accuracy having a high mechanical strength.

According to the light receiving means of the present invention, the linear sensor is disposed in a direction (X direction) orthogonal to the image of plural slits, and the processing means determines a motion larger than the pattern pitch on the basis of an amount of shift relative to the linear sensor and determines a motion smaller than the pattern pitch by calculating a pattern phase based on Fourier transform, to determine an inclination in X direction. On the other hand, an inclination in Y direction is determined by utilizing the width of slit image which varies in Y direction. Thus, with a single linear sensor, it is possible to detect inclinations in two X- and Y-axis directions. Such a simple structure improves the reliability of the inclination sensor and contributes to the reduction of cost. These excellent effects are attained by the present invention.

In the present invention, moreover, as to an amount of shift smaller than the pitch of slit image, it is calculated by performing Fourier transform to calculate the phase of slit pattern. Therefore, it is not necessary to set the accuracy of the dark field pattern higher than necessary and it is possible to make an inclination measurement with a high accuracy. In particular, since Fourier transform is utilized, there is attained an excellent effect such that a shape error and a pitch error in the dark field pattern are propagated so as to be less reflected in the final inclination angle.

What is claimed is:

1. An inclination sensor comprising:

a light source;

a first optical system for collimating the light emitted from said light source;

a dark field pattern which allows the light from said first optical system to pass therethrough;

a first liquid member having a free surface, said first liquid member being disposed so as to receive obliquely the light which has passed through said dark field pattern;

a second optical system for focusing the light reflected by said first liquid member;

a light receiving means for receiving a light image formed by said second optical system; and a processing means for calculating an inclination on the basis of a reception signal provided from said light receiving means, said dark field pattern comprising a plurality of slits in such a manner that central lines of the pattern are arranged at equal pitches in one direction and that the pattern width varies in a direction orthogonal to said one direction.

2. An inclination sensor comprising:

a light source;

a first optical system for collimating the light emitted from said light source;

a dark field pattern which allows the light from said first optical system to pass therethrough;

a first liquid member having a free surface, said first liquid member being disposed so as to receive vertically the light which has passed through said dark field pattern;

a second optical system for focusing the light which has passed through said first liquid member;

a light receiving means for receiving a light image formed by said second optical system; and a processing means for calculating an inclination on the basis of a reception signal provided from said light receiving means, said dark field pattern comprising a plurality of slits in such a manner that central lines of the pattern are arranged at equal pitches in one direction and that the pattern width varies in a direction orthogonal to said one direction.

3. An inclination sensor comprising:

a light source;

a first optical system for collimating the light emitted from said light source;

a dark field pattern which allows the light from said first optical system to pass therethrough;

a half mirror for changing the direction of the light which has passed through said dark field pattern;

a first liquid member having a free surface for reflecting the light thus changed in direction by said half mirror;

a second optical system for focusing the light reflected by said first liquid member;

a light receiving means for receiving a light image formed by said second optical system; and a processing means for calculating an inclination on the basis of a reception signal provided from said light receiving means, said dark field pattern comprising a plurality of slits in such a manner that central lines of the pattern are arranged at equal pitches in one direction and that the pattern width varies in a direction orthogonal to said one direction.

4. An inclination sensor according to claim 3, including a second liquid member having a free surface for reflecting the light which has passed through said half mirror and for directing the reflected light to said light receiving means via said second optical system, to permit use of the inclination sensor in two directions.

5. An inclination sensor according to any of claims 1 or 2, wherein said light receiving means is a linear sensor disposed in a direction (x direction) orthogonal to the image formed by said plural slits, and said processing means is constructed so as to determine a motion larger than said equal pattern pitches on the basis of an amount of shift relative to said linear sensor and to determine a motion smaller than said equal pattern pitches by calculating a pattern phase according to a Fourier transform, thereby determining an inclination in the Y direction by utilizing the width of the slit image which varies in the Y direction.

6. An inclination sensor, comprising:

a light source;

a first optical system for collimating the light emitted from said light source;

a dark field pattern which allows the light from said first optical system to pass therethrough;

a swingable suspended member being disposed so as to receive obliquely the light which has passed through said dark field pattern;

a second optical system for focusing light reflected by said swingable suspended member;

a light receiving means for receiving a light image formed by said second optical system; and a processing means for calculating an inclination on the basis of a reception signal provided from said light receiving means, said dark field pattern comprising a plurality of slits in such a manner that central lines of the pattern are arranged at equal pitches in one direction and that the pattern width varies in a direction orthogonal to said one direction.

7. An inclination sensor, comprising:

a light source;

a first optical system for collimating the light emitted from said light source;

a dark field pattern which allows the light from said first optical system to pass therethrough;

a swingable suspended member being disposed so as to receive vertically the light which has passed through said dark field pattern;

a second optical system for focusing the light which has passed through said swingable suspended member;

a light receiving means for receiving a light image formed by said second optical system; and a processing means for calculating an inclination on the basis of a reception signal provided from said light receiving means, said dark field pattern comprising a plurality of slits in such a manner that central lines of the pattern are arranged at equal pitches in one direction and that the pattern width varies in a direction orthogonal to said one direction.

8. An inclination sensor, comprising:

a light source;

a first optical system for collimating the light emitted from said light source;

a dark field pattern which allows the light from said first optical system to pass therethrough;

a half mirror for changing the direction of the light which has passed through said dark field pattern;

a swingable suspended member for reflecting the light thus changed in direction by said half mirror;

a second optical system for focusing light reflected by said swingable suspended member;

a light receiving means for receiving a light image formed by said second optical system; and a processing means for calculating an inclination on the basis of a reception signal provided from said light receiving means, said dark field pattern comprising a plurality of slits in such a manner that central lines of the pattern are arranged at equal pitches in one direction and that the pattern width varies in a direction orthogonal to said one direction.

9. An inclination sensor according to claim 8, including a second liquid member having a free surface for reflecting the light which has passed through said half mirror and for directing the reflected light to said light receiving means via said second optical system, to permit use of the inclination sensor in two directions.

10. An inclination sensor according to any of claims 6 to 8, wherein said light receiving means is a linear sensor disposed in a direction (x direction) orthogonal to the image formed by said plural slits, and said processing means is constructed so as to determine a motion larger than said equal pattern pitches based on the amount of shift relative to said linear sensor and to determine a motion smaller than said equal pattern pitches by calculating a pattern phase according to a Fourier transform, thereby determining an inclination in a Y direction by utilizing the width of the slit image which varies in the Y direction.

11. In a surveying instrument including a body and the inclination sensor of any of claims 1–3, 7 or 8, wherein said inclination sensor is attached to said body of the surveying instrument to detect inclination in both X and Y directions.

* * * * *

UNITED STATES PATENT AND TRADEMARK OFFICE
CERTIFICATE OF CORRECTION

PATENT NO. : 5,893,215

DATED : April 13, 1999

INVENTOR(S) : Kumagai et al.

It is certified that error appears in the above-identified patent and that said Letters Patent is hereby corrected as shown below:

Column 7, line 12, "or" should read -- to -- ;

Column 7, line 13, "2," should read -- 3, --;

Column 8, line 52, "7 or 8," should read -- 6 to 8, --.

Signed and Sealed this

Eleventh Day of July, 2000

Attest:

Attesting Officer

Q. TODD DICKINSON

Director of Patents and Trademarks